(12) United States Patent
Thomas

(10) Patent No.: US 11,943,205 B2
(45) Date of Patent: Mar. 26, 2024

(54) SECURE REMOTE ACCESS TO HISTORICAL DATA

(71) Applicant: Real Innovations International LLC, Georgetown (CA)

(72) Inventor: Andrew S. Thomas, Georgetown (CA)

(73) Assignee: Real Innovations International LLC, Georgetown (CA)

( * ) Notice: Subject to any disclaimer, the term of this patent is extended or adjusted under 35 U.S.C. 154(b) by 0 days.

(21) Appl. No.: 18/182,558

(22) Filed: Mar. 13, 2023

(65) Prior Publication Data

US 2023/0216831 A1 Jul. 6, 2023

Related U.S. Application Data

(63) Continuation of application No. 17/239,988, filed on Apr. 26, 2021, now Pat. No. 11,627,114.

(60) Provisional application No. 63/020,298, filed on May 5, 2020, provisional application No. 62/704,196, filed on Apr. 27, 2020.

(51) Int. Cl.
*H04L 29/06* (2006.01)
*H04L 9/40* (2022.01)

(52) U.S. Cl.
CPC ........ *H04L 63/029* (2013.01); *H04L 63/0218* (2013.01); *H04L 63/108* (2013.01)

(58) Field of Classification Search
USPC ......................................................... 726/11
See application file for complete search history.

(56) References Cited

U.S. PATENT DOCUMENTS

| | | | |
|---|---|---|---|
| 6,625,643 B1 | 9/2003 | Colby | |
| 7,787,497 B1 | 8/2010 | Long | |
| 8,661,092 B2 | 2/2014 | Thomas | |
| 9,100,424 B1 | 8/2015 | Thomas | |
| 9,288,272 B2 | 3/2016 | Thomas | |
| 9,667,689 B2 | 5/2017 | Thomas | |
| 9,762,675 B2 | 9/2017 | Thomas | |
| 10,416,660 B2 * | 9/2019 | Maturana | G05B 23/0227 |
| 10,498,796 B2 | 12/2019 | Thomas | |
| 11,627,114 B2 | 4/2023 | Thomas | |
| 2008/0297513 A1 * | 12/2008 | Greenhill | G06Q 99/00 345/589 |
| 2016/0301704 A1 * | 10/2016 | Hassanzadeh | G06F 21/64 |
| 2018/0314240 A1 | 11/2018 | Velagapalli et al. | |
| 2019/0089741 A1 * | 3/2019 | Hill | H04L 63/0876 |
| 2019/0116160 A1 * | 4/2019 | Bhat | H04L 63/08 |

(Continued)

OTHER PUBLICATIONS

PCT International Search Report and Written Opinion in International Appln. PCT/IB2021/000274, dated Jul. 16, 2021, 13 pages.

(Continued)

*Primary Examiner* — Sanchit K Sarker
(74) *Attorney, Agent, or Firm* — Merchant & Gould P.C.

(57) ABSTRACT

Systems and methods for providing access to historical data over a real-time tunnel are disclosed. The method provides a mechanism for secure communication between one or more historians. In an example, attack surfaces on historians in an industrial control system operational technology (OT) network and in an information technology (IT) networks are reduced and possibly entirely eliminated by tunneling through a DMZ (de-militarized zone) or "secured network".

37 Claims, 4 Drawing Sheets

(56) References Cited

U.S. PATENT DOCUMENTS

2019/0141058 A1* 5/2019 Hassanzadeh ...... H04L 41/0631
2019/0150134 A1* 5/2019 Kakinada ............. H04W 16/14
370/330

OTHER PUBLICATIONS

PCT International Preliminary Report on Patentability in International Appln. PCT/IB2021/000274, dated Nov. 10, 2022, 7 pages.

* cited by examiner

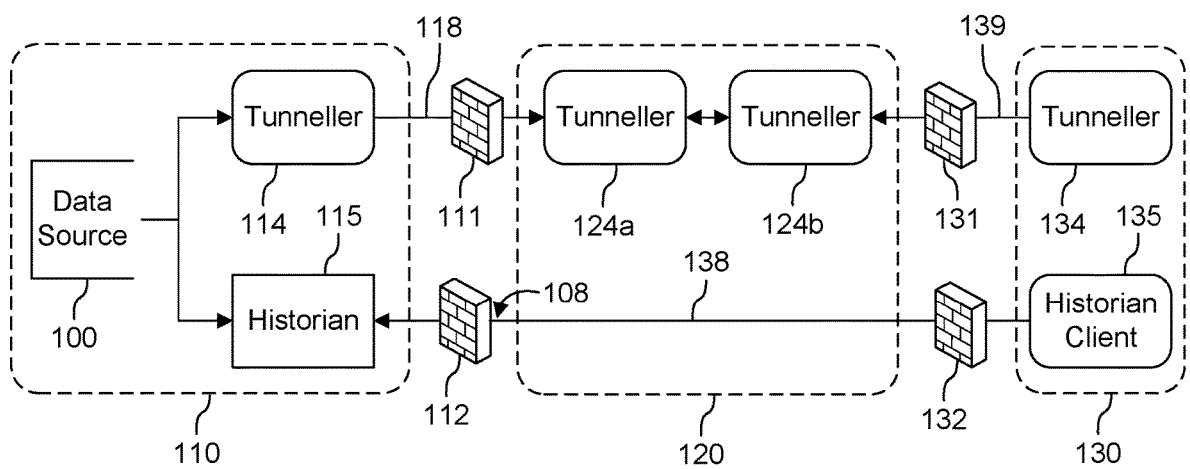
FIG. 1 – Prior art
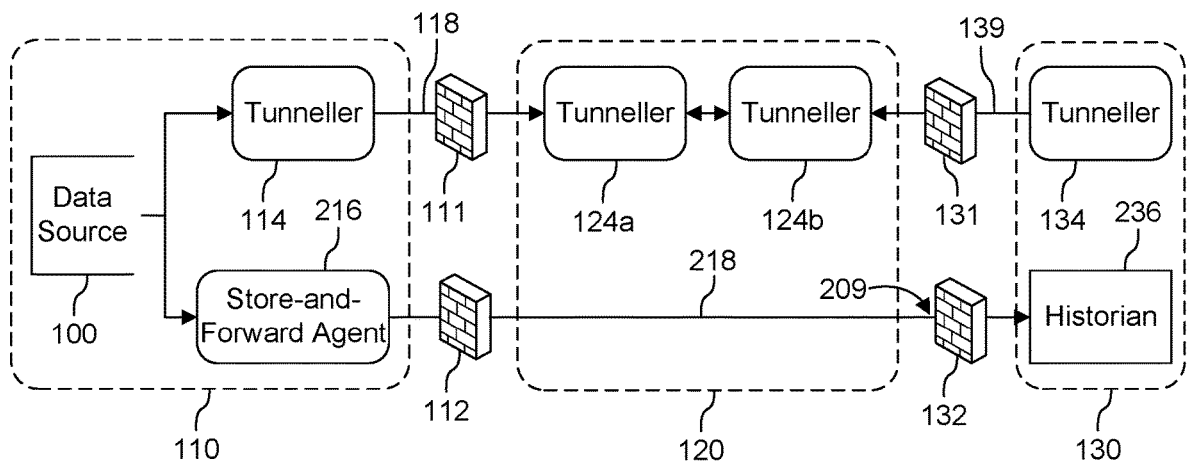
FIG. 2 – Prior art

SECURE REMOTE ACCESS TO HISTORICAL DATA

CROSS REFERENCE TO RELATED APPLICATIONS

This application claims priority to and is a Continuation of U.S. patent application Ser. No. 17/239,988, filed Apr. 26, 2021, which claims the benefit of U.S. Provisional Application No. 63/020,98 filed on May 5, 2020, and U.S. Provisional Application No. 62/704,196 filed Apr. 27, 2020, which applications are incorporated herein by reference in their entirety herein.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND REFERENCES

The systems and methods described in U.S. Pat. Nos. 8,661,092, 9,100,424, 9,288,272, 9,667,689, 9,762,675, 10,498,796 are relevant background. These patents are incorporated herein by reference in their entireties for any and all purposes.

BACKGROUND OF THE INVENTION

Real-time data refers to any digital or analog information that should be processed and/or transmitted within a certain amount of time after that data is originally created. The time elapsed from the moment that the data is created until it is processed and/or transmitted is known as latency. The maximum latency allowable for any particular real-time application is application-dependent. Applications where the maximum latency is a strict requirement can be referred to as "hard" real-time applications, while applications where the maximum latency is not a strict requirement can be referred to as "soft" real-time applications. Soft real-time applications need only satisfy an application-dependent, often subjective, measure of "fast enough". Non-real-time data is data that is not required to satisfy any particular latency requirement.

The term "data" may refer to hard real-time, soft real-time or non-real-time data. "Real-time data" may refer to hard real-time or soft real-time data.

Real-time data is typically generated by a physical process or a computer program external to the computer system that processes the data. For example, real-time data may include: information from an industrial process control system such as motor status, fluid tank level, valve position, conveyor speed and so on; prices, volumes, etc. for financial instruments such as stocks; user interface events such as an indication that a user has clicked on a button on a computer display; data entry by a human operator; and computer operating system status changes. Virtually any information that is changing over time can be treated as real-time data.

An originator of data may be described as a "data source". For example, data may originate as a physical process, measured electrically, and converted to a digital representation, or data may originate in a digital representation. Generally, data is made available in a digital computer as a digital representation, following zero or more steps to convert the data into a digital representation. A data source may comprise all of the components and steps necessary to convert the data to a digital form accessible by a computer program.

Analogous to a data source is a "data sink". A data sink consumes, or uses, data. Some examples of data sinks are: actuators in a process control system; trade processing software in a stock trading system; a user interface application; a database or other data storage system.

Many data sources are also data sinks. Accordingly, a data source may comprise a data source, a data sink, or both simultaneously. For example, when data is transmitted to a data source, the data source may also act as a data sink.

In computer applications, data is commonly managed by a "server". The server can act as either a data source or a data sink, or both together, allowing "client" applications to interact with the data that the server manages.

Generally, a client application must initiate a connection with a server in order to interact with data. That connection can be "short-lived", where the connection exists only for the duration of a single or few interactions with the data, or "long-lived", where the connection persists for many interactions with the data, and possibly for the duration of the client application's lifetime. Long-lived connections are also referred to as "persistent" connections.

Data sources provide data in one or more "data formats" that define the digital representation of the data. The data format may conform to a published standard or be particular to the data source. Similarly, data sinks may require data in a published standard format or in a format particular to the data sink.

Data sources provide access to data through one or more "transmission protocols". A transmission protocol specifies the mechanism by which data are transferred from a data source to a data sink. A transmission protocol may conform to a published standard or be particular to the data source. A data source may combine data formats and transmission protocols such that not all supported data formats can be transmitted via all supported transmission protocols. Generally, a "protocol" or "data protocol" refers to the combination of a particular data format transmitted via a particular transmission protocol.

A data sink must support at least one data protocol offered by a data source in order to use the data generated by the data source. Since a large number of data protocols exist, it is impractical for all data sources and data sinks to support all data protocols. As a result, client applications that make use of data are usually created only to support the most necessary protocols for their primary purpose. Similarly, data sources generally support only those protocols that are necessary for their primary purpose.

A protocol conversion step must be performed to convert data from a protocol supported by a data source into a protocol supported by a data sink in order for the data sink to make use of the data offered by the data source. This conversion step can be performed by a "middleware" application. A primary purpose of a middleware application may be to facilitate communication between a data source and a data sink, usually by converting data from one protocol to another such that data sources and data sinks can interact indirectly when they share no protocol in common.

A data source may transfer data to a data sink using at least two methods:

1. On demand: the data source passively waits for a data sink to request some or all of the data available in the data source. When the data sink makes a request for data, the source responds with a result indicating the current state of the requested data. If the data sink needs to be informed of changes to the data, the data sink must repeat the request in order for the data source to respond with the updated data. This repeated request for the same data by the data sink is known as "polling". A data sink may create either a short-lived connection to the data source for each new request, or a persistent connection over which many repeated requests are transmitted.

2. By subscription: the data sink creates a persistent connection to the data source, and subscribes to some or all of the data available from the data source. The data source transmits any changes to the data via the persistent connection as those changes occur. The data source will continue to send changes to the data until the data sink specifies otherwise or the connection is closed.

It is understood that data transfer methods such as shared memory, message queues and mailboxes are variations on either the demand or subscription methods. It is also understood that the terms data transfer, data propagation, or data transmission all refer to the movement of data within a system, and these terms may be used interchangeably, as they relate to the specific data transfer method. It is further understood that these methods are independent of the underlying transmission protocol.

Computer applications dealing with real-time data ideally are reliable, responsive and easily connected to their data sources. This has meant that real-time data processing applications have historically been created as stand-alone applications connected directly or indirectly to the data source.

A common alternative to HTTP is to provide a secondary communication socket for high-speed data alongside the HTTP communication channel. Effectively, the web client communicates via HTTP for the presentation information, and via a separate dedicated socket for high-speed bi-directional data communication. This solves the speed issue, but introduces other issues:

A separate communication socket requires a separate TCP port to be open on the server. This means another opening in the corporate firewall, which IT departments commonly resist.

Rich Internet Application (RIA) frameworks, such as Flash or Silverlight, commonly implement limits on socket communication that require yet another well-known port to be open to act as an access policy server. This introduces a further opening in the corporate firewall, further limiting the usefulness of the technique.

An RIA framework operating within a browser (e.g., Silverlight) may not implement its own SSL layer, relying instead on the browser's HTTPS implementation for encryption. In such a case, a dedicated socket implemented by an RIA will not be secure.

Dedicated sockets will not pass through web proxies.

The advent of high-speed or real-time data processing over the Internet has created a need for long-lived high-speed socket communication. This need has driven the RIA implementers to offer such sockets, but with the limitations described above. There remains an unmet need for long-lived bi-directional socket communication over HTTP or, more preferably, HTTPS to a web server.

The HTML5 WebSockets specification defines an API that enables web pages to use the WebSockets protocol for two-way communication with a remote host (e.g., between a client and server using a HTTP-mediated socket). Web-Sockets provides the ability to create bi-directional connections through forward and reverse web proxies. Aspects of the present invention described herein enable real-time data connectivity through WebSockets, providing successful connectivity even in instances where the data source or end user are isolated from the Internet via proxy servers and are unable to make a connection via an arbitrary TCP/IP port. This significantly broadens the set of network topologies on which the current invention may be usefully implemented while allowing an additional potential level of security on the client networks.

Since open platform communications (OPC) was introduced, it has seen a steady rise in popularity within the process control industry. Using OPC, automation professionals can now select from a wide range of client applications to connect to their programmable logic controls (PLCs) and hardware devices. The freedom to choose the most suitable OPC client application for the job has created an interest in drawing data from more places in the plant.

A widely-used OPC protocol for real-time data access is OPC DA. However, networking OPC DA is challenging. The networking protocol for OPC DA is distributed component object model (DCOM), which was not designed for real-time data transfer. DCOM is difficult to configure, responds poorly to network breaks, and has serious security flaws. Using DCOM between different LANs, such as connecting between manufacturing and corporate LANs are challenging to configure. Using OPC DA over DCOM also requires more network traffic than some networks can handle because of bandwidth limitations, or due to the high traffic already on the system. To overcome these limitations, there are various tunnelling solutions on the market. A so-called "tunneller" provides a relatively easy-to-configure, secure, and robust networking for data protocols that are difficult to connect or that rely on insecure architectures. As used herein a "tunneller" is an application that encapsulates data from a first communication protocol within a second communication protocol for the purpose of transmitting the data available in the first protocol with the transmission characteristics of the second protocol. The first and second protocols can be the same or different protocols. A tunneller can eliminate the need for VPNs and inbound firewall ports into operations networks. The present invention is suitable to augment industrial Supervisory Control And Data Acquisition ("SCADA") systems or Industrial Control Systems ("ICS"). ICS comprise data collection hardware such as sensors and other devices, communication networks, central processing systems, and display units to allow plant operators and engineers to view the data in their industrial processes in real time. ICS often comprise interfaces that support a supervisory level of coordination and control, such as uploading new recipes to a candy-making machine, changing global settings on a wind turbine, or acknowledging a high pressure alarm for a boiler.

ICS have evolved over time. The first generation systems were "monolithic", running on individual computers, connecting to field devices directly. The second generation allowed "distributed" processing, using multiple computers communicating with each other over a local-area network ("LAN") and communicating with the field devices over proprietary control networks. The current, "networked", generation uses personal computers and open standards such as TCP/IP and open protocols for local-area networking. Thus it is now possible to access ICS and data from the Internet, although there are fundamental questions about security that are limiting the broad adoption of such capabilities.

Networked ICS are designed using a client/server model. A server (device or software application) contains a collection of data items. These data items are made available to a client (device or software application) upon request by the client. The implicit assumption is that the server is the authoritative source of the data values, and has a-priori knowledge of which data values it will supply. The client is non-authoritative, and determines which data items it may use by querying the server. For clarity, the authoritative source of data has the responsibility to determine which data items it will contain and make available to its clients, and the data values held in the authoritative source are presumed to be correct and current. The client cannot determine which data items exist, and may only affect the values and/or properties of the data items defined within the server.

Importantly, the server is simultaneously the authoritative data source and also a listener for incoming connections from the client. In a networked system, this means that any client that uses the data must be able to initiate a connection to the server. In an ICS, this would mean, for example, that an operator workstation (acting as a client) must be able to make a connection to the SCADA server. This in turn requires that the SCADA server be reachable via the network from the client's location. In the case of an Internet-based or cloud-based system, this means that the SCADA server must be reachable from the Internet, posing an unacceptable security risk. For clarity, the terms "cloud" and "Internet" may be used interchangeably throughout this disclosure.

When the topic of cloud computing is raised among process control engineers, there are many justifiable concerns about security. SCADA and other manufacturing and control systems often support high-value production lines, where any interference or foul play could cost thousands or millions of dollars. Although some shop floors make their process data available to the rest of the company on corporate LANs, there is strong resistance to opening ports in plant firewalls to allow incoming connections from the Internet.

On the other hand, cloud systems generally require Internet access, typically using a web browser HMI ("Human Machine Interface") or RIA or other kind of client to connect to a server on the process side. This meant that a port had to be opened in the factory firewall to allow the web browser to connect. And this is a security risk that few plant engineers are willing to take. The primary source of security exploits is firewalls permitting inbound connections. Unless these are removed, the plant is exposed to attack.

Due to the mission-critical nature of ICS, engineers and managers responsible for industrial processes are reluctant to expose them directly to the Internet, running behind secure firewalls to keep intruders and hackers at bay. Compounding the problem is that the architecture of most installed industrial systems is still not developed with the Internet in mind. To adequately address the concerns of industrial users, different approaches to data networking are needed.

The systems and methods described in U.S. Pat. Nos. 9,100,424, 9,288,272, 9,762,675 made it possible for a client to connect to a server behind a firewall without opening that firewall to any inbound connection requests by employing novel approaches to security that meet the stringent requirements of industrial users of real-time data.

Industrial control systems (ICS) applications commonly collect information from real-time data sources and store it into a so called "data historian" (also referred to as an "operational historian"). A data historian is a program or method that records changes to the real-time data for later retrieval. This information can then be used for charting, analysis, replay or other non-real-time applications. The information is sometimes referred to as "historical data".

To be fast and reliable, the historical data is typically stored as close as possible to the data source. For example, if data is being collected via a LAN from a programmable logic controller (PLC), the data historian should reside on the same LAN, or even on the PLC itself, to minimize the chance of data loss due to network congestion or network failure. This presents a problem for the eventual user—the historical data resides within the control system network, but the user may not have access to that network.

Prior solutions to this problem consist of providing limited network access to the historical information via virtual private networks (VPNs) or by opening the ICS's firewall to some external access. VPNs and open firewalls present a security risk to the ICS that is generally not acceptable. Also, where some access is permitted, it is narrowly defined to allow only privileged users to access the ICS historian. This means, for example, that historical information cannot be shared with equipment suppliers and third-party systems (e.g., third party vendor client devices that require access to the equipment).

Ideally, an ICS network should allow no outside access at all. Even the corporation that owns the ICS network may not want access from its other internal networks. Information that is useful beyond the ICS can be pushed from the ICS network to an external network, via a firewall that is closed to all inbound traffic. This is commonly done by running two historians, one inside the ICS network, and one outside the ICS network. The inside historian makes an outbound connection through a closed firewall to the outside historian, pushing the data to the outside historian, where it is replicated. This configuration is sometimes described in terms of an "edge" historian and "outside" or "central" historian. The "edge" historian is arranged to transmit its contents to an "outside" or "central" historian. This configuration is commonly found in distributed systems where historical data is collected at many ICS networks and aggregated at a central IT network.

Users beyond the ICS network who need access to the historical information can access it via the outside or central historian. However, this configuration introduces a new security risk. The outside or central historian typically resides within a corporate information technology (IT) network and needs to be accessible by users who may be remote workers or members of third parties (e.g., third party vendors). To secure this access, the IT network could again implement a VPN or a narrowly open firewall. This, however, exposes the IT network to the same kind of attack that the ICS is avoiding. Simply pushing the historical data to a second historian only moves the point of attack without eliminating it.

Referring to FIG. 1, a prior art example ICS configuration is illustrated, which provides for the networking of real-time data and historical data from an operational technology (OT) network 110 to an IT network 130, separated from direct communication by "secured network" or DMZ (de-militarized zone) 120. In this example, data source 100, typically from an industrial plant or device, provides real-time data to tunneller 114 for retransmission over real-time data connections or tunnels 118, 139 established between tunnellers 114 and 124*a*, and between tunnellers 124*b* and 134, respectively.

Tunneller 114 and historian 115 are situated inside OT network 110, and behind firewalls 111, 112, respectively, to protect from unauthorized access from any third parties (not shown) to OT network 110. Optionally, firewalls 111 and 112 may be the same firewall. Arrow 118 symbolically shows tunneller 114 making an outbound tunnel connection to tunneller 124a, and through firewall 111. Once established, tunnel 118 is a bi-directional connection allowing data and data requests to flow in either direction. Firewall 111 does not require any open inbound connection ports to establish tunnel 118, and therefore OT network 110 is inaccessible from DMZ 120 via firewall 111.

Similarly, tunneller 134 and historian client 135 are situated inside IT network 130, and behind firewalls 131, 132, respectively, to protect from unauthorized access from any third parties (not shown) to IT network 130. Optionally, firewalls 131 and 132 may be the same firewall. Arrow 139 symbolically shows tunneller 134 making an outbound tunnel connection to tunneller 124b, and through firewall 131. Once established, tunnel 139 is a bi-directional connection allowing data and data requests to flow in either direction. Firewall 131 does not require any open inbound connection ports to establish tunnel 139, and therefore IT network 130 is inaccessible from DMZ 120 via firewall 131.

Data source 100 also provides data to historian 115 for storage. Historical data must be networked from historian 115 to historian client 135 via a separate connection (represented by arrow 138) because to access historian 115, the historian client 135 requires a dedicated port. Connection 138 is shown as initiating from historian client 135, through firewalls 132, 112 and to historian 115. In order for historian client 135 to access data on historian 115, firewall 112 must be configured to allow an incoming connection from outside firewall 112 by opening a port 108. In this prior art example, historian 115 and OT network 110 are exposed to incoming requests originating from DMZ 120, and therefore firewall 112 provides a point of attack or vulnerability that may be exploited. The purpose of DMZ 120, which is to isolate OT and IT networks, is defeated by the necessity to open firewall 112 to an incoming connection, thereby allowing IT network 130 direct access into OT network 110.

Referring to FIG. 2, a prior art example of another commonly-used system configuration is illustrated. This system provides for the networking of real-time data and historical data from OT network 110, through DMZ 120, to IT network 130. Similar to FIG. 1, data source 100 provides real-time data to tunneller 114 for retransmission over real-time data connections or tunnels 118, 139 established between tunnellers 114 and 124a, and between tunnellers 124b and 134. However, in contrast to FIG. 1, a historian 236 is situated in IT network 130 (i.e., instead of OT network 110). A store-and-forward (SAF) agent is used by an object that generates notifications. When an object registers interest in receiving notifications of a particular event type, the object receiving that registration will pass the registration along to the store-and-forward agent. In this example system, data source 100 sends data to a store-and-forward agent 216 for storage and forwarding. Historical data is networked from store-and-forward agent 216 to historian 236 via a separate connection (represented by arrow 218) because to access the historian 236, the store-and-forward agent 216 requires a dedicated port. Connection 218 is shown as initiating from store-and-forward agent 216, through firewalls 112, 132 and to historian 236. In order for store-and-forward agent 216 to write data to historian 236, firewall 132 must be configured to allow an incoming connection from outside firewall 132 by opening a port 209. In this prior art example, historian 236 and IT network 130 are exposed to incoming requests originating from DMZ 120, and therefore firewall 132 provides a point of attack or vulnerability that may be exploited. Similar to the example in FIG. 1, isolation of IT network 130 is defeated by the necessity to open firewall 132 to an incoming connection, thereby allowing OT network 110 direct access into IT network 130.

When the DMZ 120 is a private network, the assumption is that a concerted malicious attack on historians 115, 236 through an open port on firewalls 112, 132, respectively, is unlikely and an acceptable risk. However, when the DMZ 120 is exposed to a public network (e.g. the Internet), the likelihood of a concerted attack on historians 115, 236 is high, and the risk is unacceptable.

None of the known existing technologies provides a mechanism for secure communication between one or more historians though a DMZ or "secured network" within an ICS network.

Accordingly, there is a need for an improved network communication means that overcomes the limitations of directly connecting to data historians, so that real time and historical data can be exchanged using one of more real time and/or historical data sources, bidirectionally and in a more robust and secure manner.

SUMMARY OF THE INVENTION

The present invention provides systems and methods for enabling access to historical data over a real-time tunnel. The methods provide a mechanism for secure communication between one or more historians. In an example, attack surfaces on historians in an industrial control system operational technology (OT) network and in an information technology (IT) networks are reduced and possibly entirely eliminated by tunneling through a DMZ (de-militarized zone) or "secured network".

Many sources of data, both real-time and non-real-time, are not intended for network use (i.e., transmission over a network). The present invention allows data from these data sources to be reliably and rapidly delivered to any historian over a network. Some data sources, such as those based on OPC, were intended for network use but are not designed for communication through a series of networks (i.e., multiple network 'hops'). Aspects of the embodiments described herein enable data from these sources to be delivered reliably and securely to a historian. Other data sources, such as database systems, provide no interface at all for real-time information. Aspects of the embodiments described herein also enable non-real-time data from sources such as database applications to be delivered as if it were real-time, thereby eliminating the need for a third party application to perform very inefficient polling of databases.

Data sources and data sinks may connect to a server via persistent connections or short-lived connections. It is understood that the connection method to the server will reflect the requirements of the particular data source or sink.

In one aspect, the present invention provides a computer readable storage medium storing instructions that, when executed on one or more computers, causes the computers to perform methods of storing and forwarding historical data as described herein.

It is understood that the at least one data source and at least one server may be implemented in at least one computer program (i.e. a single computer program, or two or more separate computer programs).

Aspects of the present invention provide a secure solution to protect both the ICS network and the IT network from external attack by allowing no VPN and no open incoming firewall ports on either network. The attack surface on both networks is thus reduced and possibly entirely eliminated. To do this, a third network must be introduced between the ICS and IT networks, commonly called a DMZ (de-militarized zone) or "secured network". A computer in the DMZ can act as a go-between to move data from the ICS network to the IT network.

A secure approach is employed by utilizing a third historian in a DMZ network, as shown in FIG. 3 and FIG. 6. Generally, an ICS historian (the "sender") makes a connection to a DMZ historian to populate the DMZ historian by pushing the data over that connection. An IT historian (the "receiver"), in turn, makes a separate connection to the DMZ historian to pull information and populate the IT historian. External clients can access the historical information in the DMZ, without exposing either the ICS or IT networks to external attack. Even a successful exploit of the DMZ computer would not expose the ICS or IT networks.

To make this possible, two capabilities are incorporated into the network architecture, referred to as "pull replication" and "daisy chaining".

One approach to replicating historical information without opening an incoming firewall port is to have the destination historian periodically poll the source historian. In the example of moving data from the DMZ to IT, this would mean that the IT historian polls the DMZ historian periodically for new information. Alternatively, in some embodiments, the IT historian opens a connection to the DMZ historian and then notifies the DMZ historian that it needs to receive updates as they occur. The DMZ historian then sends those updates to the IT historian with no further requests from the IT historian. The reversal of the initial request for historical data is referred to as "pull replication".

As noted previously, typical historians provide a form of replication where an "edge" historian transmits its contents to an "outside" or "central" historian. And as explained above, this topology represents a security risk at the IT network. The features of the embodiments described herein reduce, if not entirely eliminate, such security risks.

Prior historians typically contemplate only one retransmission of data: from the ICS network to the IT network. Aspects of the embodiments described herein implement a more secure topology by incorporating a DMZ or secured network and involving two or more retransmissions of the historical data. Providing two or more retransmissions of the historical data is referred to herein as "daisy chaining" historical data. To be reliable, each transmission point in the daisy chain includes local storage to prevent data from getting lost due to network outages at any stage of transmission.

The combination of pull replication and daisy chaining of historical data makes it possible to store-and-forward historical data in a more secure and robust manner.

A connection can be any network connection. For example, a connection can be made either to the same computer or another computer. In some cases, a network policy may limit the ports and types of connections available. It may be the case that outbound TCP connections are limited to HTTP and HTTPS ports. This limitation can be combined with a forward proxy as an additional security feature. Some historian replication systems are implemented by the historian vendor and use distinct TCP ports and custom protocols. These protocols cannot be used when forward proxies and port limitations are in place. To resolve this connectivity issue, aspects of the present invention enable historical data to be transmitted over a WebSocket connection.

This can be accomplished by marshaling the historical data at the source, transmitting it over the WebSocket, and then un-marshaling it at the destination before writing it to the destination historian. A WebSocket can, in turn, operate correctly over an HTTP proxy and can use the HTTP and HTTPS ports.

Historical data commonly originates as real-time data that is stored for future use. Many applications require both the real-time data and the historical data simultaneously. For example, a SCADA system must display the current status of transducers in real time, while also providing charting capabilities based on historical information. This becomes an issue when the operator interface is remote from the ICS network. It is technically challenging to supply the real-time information to a remote operator interface without compromising the ICS network security. Generally, aspects of the present invention solve this problem by using a tunneling connection for real-time data that transmits the data through an outbound connection over a TCP socket or WebSocket. Historical data is not real-time data and must be treated differently. If a tunnel exists for real-time data aspects of the present invention makes it possible to also transmit the historical data over the same tunnel, thereby interleaving historical and real-time data over the same underlying connection. In some embodiments, the historical data is data compressed by using a data compression process.

Although this description refers to its application to industrial control (ICS) or SCADA systems, it should be understood that this same mechanism is broadly applicable for any historical data that may be made available via databases or historians. That data could originate from any program or process, such as financial trading systems, home electricity meters, remote machinery, cell phones, embedded devices, or any other program or device that generates data, and still fall within the scope of the present invention. In one aspect of the invention, a common requirement is that the data source is not be required to accept inbound network connections in order to make its data available to users of that data.

BRIEF DESCRIPTION OF THE FIGURES

FIG. 1 is a block diagram illustrating an example prior art system implementation.

FIG. 2 is a block diagram illustrating an example prior art system implementation.

DETAILED DESCRIPTION OF THE INVENTION

Figure 3:
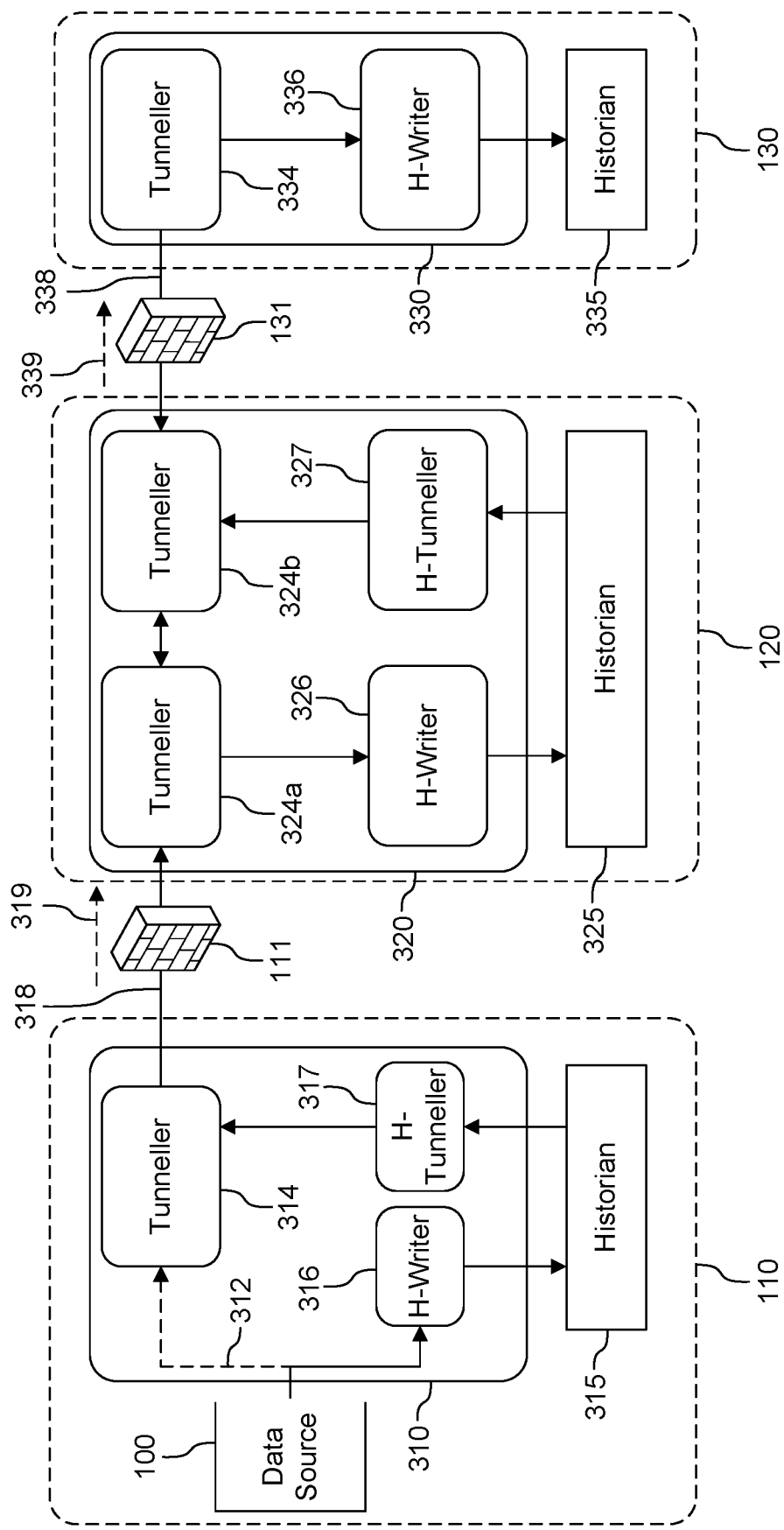
FIG. 3 is a block diagram illustrating an example system implementation, in accordance with one embodiment of the present invention.

The following description is presented to enable any person skilled in the art to make and use the invention, and is provided in the context of particular applications of the invention. Various modifications to the disclosed embodiments will be readily apparent to those skilled in the art, and the general principles defined herein may be applied to other embodiments and applications without departing from the scope of the present invention. Reference to various embodiments and examples does not limit the scope of the invention, which is limited only by the scope of the claims attached hereto. Additionally, any examples set forth in this specification are not intended to be limiting and merely set forth some of the many possible embodiments for the claimed invention.

The program environment in which a present embodiment of the invention is executed illustratively incorporates a general-purpose computer or a special purpose device such as a hand-held computer, telephone or PLC. Details of such devices (e.g., processor, memory, data storage, display) may be omitted for the sake of clarity.

It is also understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable media may include volatile (e.g., RAM) and/or non-volatile (e.g., ROM, disk) memory, carrier waves, non-transitory computer-readable mediums, and transmission media (e.g., copper wire, coaxial cable, fiber optic media). Exemplary carrier waves may take the form of electrical, electromagnetic or optical signals conveying digital data streams along a local network, a publicly accessible network such as the Internet or some other communication link.

In reference to the example embodiments shown in the figures, it is understood that simplified examples were chosen for clarity. Single instances of an element (e.g. a historian, a tunneller, a server, a client, a data source, a data sink, etc.) appearing in the figures may be substituted for a plurality of the same element, and still fall within the scope of the present invention.

The server may further can include one or more components selected from: a data modification component; a data creation component; a user interface component; a computer file system interaction component; a program interaction component for interacting with other programs running on a computer running the server; a scripting language component to perform programmable actions; a HTTP component for accepting HTTP requests from client programs and respond with documents as specified by those requests, in a manner analogous to a "web server", including the ability to dynamically construct the document in response to the request, and to include within the document the current values of the data resident in the server and the results of executing statements in the server's built-in scripting language; a synchronization component to exchange and synchronize data with another running instance of the server on any local or network-accessible computer, such that both servers maintain essentially identical copies of that data, thereby enabling client applications connected to either instance of the server to interact with the same data set; a first throttling component to limit the rate at which data is collected; a second throttling component to limit the rate at which data is emitted; a connectivity component to detect a loss of connectivity to other servers, and to reconnect to the other servers when connectivity is regained; a redundancy component to redundantly connect to multiple other servers of identical or similar information such that data from any of the other servers may be collected in the event that one or more of the other servers is inaccessible; and a bridging component to "bridge" data among sources of data such that some or all of the data within those sources will maintain similar values with one another, or bridge data among data sources including a mathematical transformation such that the data in one source is maintained as the mathematical transformation of the data in the other source, including the ability to apply the mathematical transformation in both the forward and inverse directions through a bi-direction bridging operation. It is understood that this set of server components could be extended by adding additional functionality to the server to support other data collection and transmission mechanisms, other processing mechanisms and other storage mechanisms.

The data collection component can collect data in one or more of the following manners: on demand, wherein the server sends a request for some or all of the data resident in another server, and that other sever responds with the current value or values of the requested data only once in response to the request; by subscription, wherein the server sends a request for a subscription to some or all of the data resident in another server, and the other server responds by sending the current value or values of its data, and then continues to send any subsequent changes to the value or values of the data until the server either terminates its connection to the other server, or requests that the other server cease sending updates; on a trigger, wherein a client, script or human (a "user") configures the server to collect the data only if a certain trigger condition is met, be that a timer, a time of day, a data change, a change in the system status, a user action or some other detectable event; and passively by waiting for a "client" application to send data to the server.

The data emission component can emit data in one or more of the following manners: on demand, wherein a "client" application sends a request for some or all of the data, and the sever responds with the current value or values of the requested data only once in response to the request; by subscription, wherein a client application sends a request for a subscription to some or all of the data, and the server responds by sending the current value or values of the data, and then continues to send any subsequent changes to the value or values of the data until the client either terminates its connection to the server, or requests that the server cease sending updates; and on a trigger, wherein a client, script or human (a "user") configures the server to emit the data only if a certain trigger condition is met, be that a timer, a time of day, a data change, a change in the system status, a user action or some other detectable event.

The data collected at the data collection component may be received using one or more transmission protocols selected from: Dynamic Data Exchange (DDE), OLE for Process Control (OPC), OPC Alarm and Event specification (OPC A&E), OPC Unified Architecture (OPC-UA), OPC Express Interface (OPC-Xi), TCP/IP, SSL (Secure Socket Layer) over TCP/IP through a custom interface, Hypertext Transfer Protocol (HTTP), Secure HTTP (HTTPS), Open Database Connectivity (ODBC), Microsoft Real-Time Data specification (RTD), Message queues, Windows Communication Foundation (WCF), industrial bus protocols such as Profibus and Modbus, Windows System Performance Counters, TCP/IP communication from embedded systems, TCP/IP communication from non-MS-Windows systems, TCP/IP communication from Linux, TCP/IP communication from QNX, TCP/IP communication from TRON, TCP/IP communication from any system offering a C compiler and TCP implementation, Scripts written using a built-in scripting language, data entered by humans through a user interface, data read from a local disk file, data read from a remotely accessible disk file, proprietary formats, user-defined formats, and formats added through extensions to the server. An example of a proprietary format is Wonderware Suite-Link™.

The data emitted from the data emission component may be transmitted using one or more transmission protocols selected from: Dynamic Data Exchange (DDE), OLE for Process Control (OPC), OPC Alarm and Event specification (OPC A&E), OPC Unified Architecture (OPC-UA), OPC Express Interface (OPC-Xi), TCP/IP, SSL (Secure Socket Layer) over TCP/IP through a custom interface, Hypertext Transfer Protocol (HTTP), Secure HTTP (HTTPS), Open Database Connectivity (ODBC), Microsoft Real-Time Data specification (RTD), Message queues, Windows Communication Foundation (WCF), industrial bus protocols such as Profibus and Modbus, TCP/IP communication to embedded systems, TCP/IP communication to non-MS-Windows systems, data presented to humans through a user interface, data written to a local disk file, data written to a remotely accessible disk file, proprietary formats, user-defined formats, formats added through extensions to the server, electronic mail (E-Mail), and Short Message Service (SMS) message format.

Further, the data collected at the data collection component may be in a format appropriate to the transmission protocol. The data emitted from the data emission component may be in a format appropriate to the transmission protocol. The data collected at the data collection component and the data emitted from the data emission component may also be in a format selected from: parenthetical expression (LISP-like) format, Hypertext Markup Language (HTML), eXtensible Markup Language (XML), JavaScript Object Notation (JSON), proprietary binary format, user-definable text format, and a format added through extension of the server.

The system may further include an Application Programming Interface (API) that implements a TCP/IP connection and one or more of the data formats supported by the server, which may assist a programmer in establishing a connection as described above. The API may be implemented for one or more of the following platforms: "C" programming language, "C++" programming language, Microsoft .Net programming environment, Microsoft Silverlight framework, Adobe Flash framework, Adobe Air framework, a programming language supporting TCP/IP communication (including any scripting language), and a store-and-forward historian framework supporting TCP/IP communication.

The store-and-forward historian framework may include support for: making a first long-lived TCP/IP data connection to the server to receive data; receiving data from the server; and transmitting data to the server over a second TCP/IP data connection. The data may be received from the server on demand or by subscription. The first TCP/IP data connection and the second TCP/IP data connection may be the same connection. The second TCP/IP data connection may be a long-lived connection. The second TCP/IP data connection may be a short-lived connection. The TCP/IP data connection to the server may be in a protocol selected from: an API, as described above, a direct TCP/IP connection, HTTP and HTTPS.

The client may be implemented using a RIA framework, a web browser, a compiled computer language, an interpreted computer language, a hardware device, or another implementation mechanism that supports the HTTP and/or HTTPS protocols. The client may comprise support for: making a first long-lived TCP/IP data connection to the server to receive data; receiving data from the server; and transmitting data to the server over a second long-lived TCP/IP data connection. The data may be received from the server on demand or by subscription. The TCP/IP data connections to the server may be in a protocol selected from: HTTP and HTTPS.

Data from the server may be received, or data to the server may be transmitted, in one or more form selected from: a parenthetical expression (LISP-like) format, Hypertext Markup Language (HTML), eXtensible Markup Language (XML), JavaScript Object Notation (JSON), a proprietary binary format, a user definable format, and a format added by extension to the server.

The store-and-forward historian framework may further include support for presenting a graphical display representing the data to a user. The graphical display may comprise one or more graphical elements selected from: a textual display, a slider, a chart, a trend graph, a circular gauge, a linear gauge, a button, a check box, a radio button, a progress bar, a primitive graphical object, controls, and a customized graphical element.

Configuration information of the graphical display may be saved on the server, as well as loaded from the server. A graphical element may be created and modified within the graphical display. The graphical element may be a customized graphical element, customizable by a user, wherein the customization may be saved on the server. Customization may be performed by a programmer, without requiring modification to an application implemented in the RIA framework. The customized graphical element may be available for use to a user in other graphical displays. These customizations may be for creating new displays, modifying existing displays, all in addition to the graphical elements originally supported by the user interface application. The graphical element may comprise one or more property that is user-modifiable, and which may be selectable by a programmer. User interaction with the graphical element may cause a user interface application to emit modifications to the data to the server. A user-only mode may be provided to disallow creation or modification of the graphical display by a user, and a read-only mode may also be provided to disallow interaction with the graphical element by the user. A system administrator may select which user and for which graphical display a user interface application will operate in one of the user-only mode and read-only mode. The user may be required to identify himself, and where such identification is required, the user interface application may operate in at least one of the user-only mode and the read-only mode. Advantageously, the features of the invention allow modification of the graphical displays through any user RIA terminal and the resulting changes, upon saving, are immediately available to all other RIA terminals connected to the server.

In another aspect, the present invention provides a method of providing bi-directional streaming communication over the HTTP or HTTPS protocol between a client and a server, the method comprising: generating a session ID; opening a first socket via a first HTTP transaction from the client to the server; associating the session ID with the first socket at the server and client; opening a second socket via a second HTTP transaction from the client to the server; associating the session ID with the second socket at the server and at the client; maintaining a long-lived connection on the first socket; and maintaining a long-lived connection on the second socket, wherein a correspondence is created among the session ID, the first socket and the second socket, and wherein bi-directional communication is established between the client and the server.

The method may further comprise the client transmitting at least one data message selected from the group comprising: configuration information, commands, real-time information, pending data from a previous transaction, and other data. The method may further comprise waiting for an event from the first socket; verifying whether the event from the first socket is an error; reading available data from the first socket when the event is not an error; processing the data to produce a result; and optionally sending the result to the server via the second socket. The method may further comprise the client: closing the first socket; and closing the second socket, wherein the event from the first socket is an error. The method may further comprise the client: waiting for a client-generated event; processing the client-generated event to produce a result; and optionally sending the result to the server via the second socket. The client-generated event may be selected from the group comprising: an internally-generated stimulus, a result of user activity, a timer, and an external stimulus. The method may further comprise the client: marking data for transmission to the server as pending; closing the second socket; opening a new second socket; and associating the new second socket with the session ID.

The method may further comprise the server: waiting for an event from the second socket; verifying whether the event from the second socket is an error; reading available data from the second socket when the event is not an error; processing the data to produce a result; and optionally sending the result to the client via the first socket. The method may further comprise the server closing the second socket, wherein the event from the second socket is an error. The method may further comprise the server: waiting for a server-generated event; processing the server-generated event to produce a result; and optionally sending the result to the client via the first socket. The server-generated event may be selected from the group comprising: an internally-generated stimulus, a result of user activity, a timer, a result from another connected client, data from a data source, and an external stimulus. The method may further comprise the server: closing the first socket; and closing the second socket.

In the above method, the first HTTP transaction may be selected from the group comprising: a HTTP GET transaction and a HTTP HEAD transaction; and the second HTTP transaction may be selected from the group comprising: a HTTP POST transaction, a HTTP PUT transaction, a HTTP PATCH transaction, and a HTTP TRACE transaction. Preferably, the first HTTP transaction is a HTTP GET transaction, and the second HTTP transaction is a HTTP POST transaction.

In yet another aspect, the present invention provides a system for providing bi-directional streaming communication over the HTTP or HTTPS protocol, the system comprising: at least one client; and at least one server, wherein the at least one client is adapted to implement the above-described method, and wherein the at least one server is adapted to implement the above-described method. The at least one client may comprise a RIA. The at least one server may comprise: a data collection component for collecting data from the at least one data source; and a data emission component for emitting data to at least one data client.

In yet a further aspect, the present invention provides a computer readable memory storing instructions that, when executed on one or more computers, causes the computers to perform a method of providing bi-directional streaming communication over the HTTP or HTTPS protocol between a client and a server, the method comprising the steps of the above-described method.

In yet a further aspect, the present invention provides a computer readable memory storing instructions that, when executed on one or more computers, causes the computers engage in a bidirectional networked real-time data exchange over the HTTP or HTTPS protocol between a data historian and a server, the method comprising the steps of the above-described method.

As described above, the HTTP protocol implements a transaction model where each transaction is generally short-lived. Each transaction is initiated by the client, and is specified to either transmit data to the server, or to request data from the server, but not both.

A web client may need to transmit or receive a large volume of data. In this case, it may implement an API that allows the client to send and receive the data in incomplete chunks. That is, it may require multiple send and receive actions before the entire data set has been transmitted. For example, a client that receives an image from a server may receive the image in chunks of 1 KB so that it can begin to render the image before the entire image has arrived to produce a progressive rendering effect. This behaviour can be leveraged within the client to produce a continuous stream of data. The client may make an HTTP GET request to a URL on a specially designed server (or a standard server with a specially designed handler for that URL). The server may respond with an HTTP header, and then hold the socket open. At any time in the future, the server may transmit data on the socket, which will arrive at the client as an incomplete transmission. The client can process this data and then wait for more. So long as the server holds the socket open, the client will simply act on the expectation that there is more data to be received, and will process it as it arrives. The server can transmit more information asynchronously to the client at any time without the need for the client to repeatedly open and close HTTP connections. This mechanism is the underlying methodology of Streaming AJAX. As disclosed above, it is uni-directional. This mechanism does not provide high-speed communication from the client to the server.

One of the important innovations of the present invention is to solve the problem of creating a high-speed connection from the client to the server. The solution provides that the client opens an HTTP POST transaction with the server, and transmits the necessary HTTP header information. The server will then wait for the data payload of the POST to arrive. At any time in the future, the client may transmit data on the open socket, effectively acting like the Streaming AJAX mechanism in the reverse direction. The client may hold the socket open indefinitely, transmitting data as necessary without having to repeatedly open and close HTTP connections for each new transmission.

The server must be aware that the data will arrive as a stream, and to process the information as it arrives. This may require custom behaviour in the server.

The HTTP protocol specifies that a client must inform the server of the size of an HTTP POST message in the HTTP headers (the content-length). It is a violation of the HTTP protocol for the client to transmit more or less data than specified in the content-length header. The present invention recognizes this by tracking the number of bytes transmitted from the client to the server. The HTTP POST content length is specified by the client to be an arbitrary number of bytes. When the client has transmitted content-length bytes, it closes its existing connection and opens a new connection and continues transmitting. The number of bytes in a POST message can be large (e.g. up to 2^31 bytes), so this open and close will happen very infrequently. The result will be a slight latency in the transmission of some data, but no loss of information.

In a preferred embodiment, the present invention requires two sockets, one handling the server-to-client communication via HTTP GET, and the other handling client-to-server communication via HTTP POST. In order for these two sockets to act in concert to provide bi-directional streaming communication, the web server must be aware that they are related halves of a single conversation. This relationship may be established by the client. The client opens the HTTP GET connection first, and includes in its URL a unique session handle (e.g., a randomly generated GUID). When the client subsequently opens the HTTP POST request, it includes the same session handle in the URL. The server is then able to associate the two connections. When the HTTP POST connection must be closed and re-opened due to reaching the content-length limit, the client transmits the same GUID again. The server is then able to associate this new POST socket with the existing GET socket.

The web server needs to understand that this methodology is being employed. It must keep track of calls to a specially designated URL for the original GET connection, associate the session handle with that connection, and then subsequently associate POST connections with the same session handle with that GET connection. It may be desirable, but not necessary, for the web server to spawn a separate thread to handle each connection pair.

Having established the GET and POST connections, the client can receive asynchronous data transmissions from the server via the GET connection and transmit asynchronous data to the server via the POST connection. The server does the reverse, transmitting data via the GET connection and receiving data via the POST connection. The behaviour of both client and server are otherwise the same as if they were communicating via a single bi-directional socket.

As will be understood by a person skilled in the art, other HTTP verbs such as HEAD, PUT, PATCH and TRACE may also be used. It will also be appreciated, for example, that it is possible to further modify a server to recognize other verbs or relax protocol restrictions on the HEAD transaction to behave like a GET. So, other verbs may be used if the server is modified to recognize the added/different behaviour. Such modifications depart from a strict implementation of the HTTP specification, yet still fall with the present invention.

The unexpected advantages of the present invention in regard to the system and method for secure real-time cloud services are several. To address security concerns, one prior art method for sharing process data on the cloud has been to use a Virtual Private Network ("VPN"). However, from a security perspective, use of a VPN is problematic because every device on the VPN is open to every other machine. Each device (and each user of said device) must be fully trusted on the VPN. Security is complex and not very good, making it virtually impossible to use this approach for open communication between companies. Accordingly, the present invention allows sharing of data between third party companies without requiring that the third parties access an existing VPN, and therefore never exposing computers and devices on the VPN to those third parties. Furthermore, VPNs also incur a performance penalty, either compromising real-time performance or significant additional cost to compensate (e.g., by requiring additional hardware, computational resources and complexity to a system).

Further advantageously, the present invention allows users to connect plant floor equipment to management as well as partner and third-party companies, using software at the plant site that is configured by the client company to allow specific data streams to be uploaded or downloaded.

The present invention may be completely software-based, and can be implemented on existing hardware, therefore not introducing significant complexity to an established network.

Advantageously, using methods disclosed herein, once the client/server connection is established, the data can flow in either direction. Client users can monitor a system in real time, effect changes, and see the effect of their actions immediately, as if they were working on a local system. Or, if required, the system can be configured from the plant to be one-way, read-only.

The present invention provides the ability to connect to any industrial system, using open, standard protocols like OPC, TCP, and ODBC. Such flexibility allows further cost reduction by fully utilizing investments in existing equipment, or enhance new installations with cloud connectivity. Examples uses of the present invention are the addition to existing ICS, enhanced function as an HMI for an individual machine, or access RTUs or even individual embedded devices.

In combination with methods disclosed herein, the present invention supports publish/subscribe data delivery, an event-driven model in which a client registers for data changes one time and then receives subsequent updates immediately after they occur. This low-latency, cloud-based system adds extremely low overhead to the overall data transmission time, effectively keeping throughput speeds to just a few milliseconds (or less) more than the network propagation time.

In one embodiment, the present invention may achieve very high-speed performance is by handling data in the simplest possible format. Providing a data-centric design, the present system can function with various kinds of data sources and users, such as control systems, OPC servers, databases, spreadsheets, web pages, and embedded devices. Preferably, when a connection is made to the cloud server, incoming data is stripped of unnecessary formatting (XML, HTML, OPC, SQL, etc.) and passed as quickly as possible to any registered clients. At the receiving end the data is delivered in whatever format the client requires.

With the methods disclosed herein, a RIA or web-based user interface for secure cloud services provide anywhere-access to register for the service, configure data connection options, and monitor usage and costs. Additionally, all data display screens may be provided via the web-based interface. This web-based HMI allows users to create pages from anywhere, and deploy them immediately.

Further advantageously, one of the benefits of cloud computing is its ability to scale up or down to meet the needs of its users. The present invention can not only handle bursts of high-speed activity in the data flow, it can also be quickly configured to meet the needs of a growing system. Users can add data points to a particular device, or bring on new devices, new ICS, even new locations and installations through an easy-to-use, web-based configuration interface.

The present invention is operable as a real-time industrial system, and can maintain a suitable level of performance and security in a cloud environment. Its sophisticated connectivity options allow the primary control system in a plant to continue functioning without disruption. The result is a robust and secure feed of live process data into an enterprise to provide opportunities for real-time monitoring, collaboration, and predictive maintenance.

Referring to FIG. 3, a system configuration for providing the secure networking of real-time data and historical data is shown. Generally, a novel and secure communication of historical data from an OT network 110, through a DMZ 120, to an IT network 130 is made possible by interleaving real-time data and historical data over a single, secure tunnel connection though firewalls 111, 131 and by a combination of pull replication and daisy chaining of historical data. As a result, firewalls 111, 131 can be closed to all inbound connection requests (i.e., no open incoming ports) from DMZ 120, thereby completely isolating both IT network 110 and OT network 130 from DMZ 120.

A data source 100 provides real-time data to a connector 310, which includes several components: a tunneller 314, a history-writer 316 and a history-tunneller 317. The data is written to history-writer 316 and optionally to tunneller 314. History-writer 316 is configured to write data to a historian 315. As shown in FIG. 3, historian 315 is external from connector 310. In other words the historian 315 is an application external from connector 310.

In an alternative embodiment (not shown), data source 100 can write data directly to historian 315, or indirectly to historian 315 via an external application. In such case, history-writer 316 can be omitted.

Data from source 100 is shown as sent indirectly to historian 315 via history-writer 316, and optionally simultaneously sent to tunneller 314, represented symbolically by broken arrow 312. Once data is stored in historian 315, this historical data can be retrieved and sent to tunneller 314 by history-tunneller 317.

First Network "Hop"

Tunnel connection 318 is established from tunneller 314 to tunneller 324a by an outbound connection request from OT network 110 to DMZ 120, as symbolically represented by the direction of arrow 318. In this embodiment, the direction of historical data flow is shown symbolically by broken arrow 319 from tunneller 314 to tunneller 324a.

If the network connection is lost and tunnel 318 is disconnected, the following steps take place upon network reconnection. Tunneller 314 re-establishes a lost connection to tunneller 324a, after which history-tunneller 317 will re-initiate transmission of any missed historical data, which history-tunneller 317 retrieves from historian 315. In turn, history tunneller 317 transmits the missed historical data via tunneller 314 over tunnel 318 to tunneller 324a. The historical data flow is represented symbolically by broken arrow 319. Historical data flow 319 is, in turn, sent from tunneller 324a to historian 325 indirectly via history-writer 326. An initial connection of tunnel 318 and a first initiation of transmission of historical data flow 319 is equivalent to a network reconnection as described above.

Once missed historical data is successfully stored in historian 325, a response is sent from historian 325 to history-writer 326 to confirm receipt of missed historical data. This confirmation is delivered via tunnellers 324a and 314 to history-tunneller 317. Optionally, this confirmation can be stored in historian 315 or elsewhere.

Distribution of real-time data among the components within connectors 310, 320, 330 could be implemented with a real-time memory-resident data store, data bus or other communication method (not shown). For example, data source 100 could write data to a memory resident data store, which then redistributes real-time data to tunneller 314 and/or history-writer 316. Similarly, communication between tunnellers 324a and 324b could be via a real-time memory resident data store, data bus or other communication method (not shown).

It is appreciated that history-writer 316 and history-tunneller 317 can be distinct processes from each other as shown in FIG. 3, but both have access to historical data in historian 315. Similarly, history-writer 326 and history-tunneller 327 can be distinct processes from each other as shown in FIG. 3, but both have access to historical data in historian 325. Further, each of connectors 310, 320, 330 may comprise a single executable or a collection of executables.

Second Network "Hop"

Tunnel connection 338 is established from a tunneller 334 to tunneller 324b by an outbound connection request from IT network 130 to DMZ 120, as symbolically represented by the direction of arrow 338. In this embodiment, the direction of historical data flow is shown symbolically by broken arrow 339 from tunneller 324b to tunneller 334.

If network connection is lost and tunnel 338 is disconnected, the following steps take place upon network reconnection. Tunneller 334 re-establishes a lost connection to tunneller 324b, after which tunneller 334 will send a request to history-tunneller 327 to re-initiate transmission of any missed historical data, which history-tunneller 327 retrieves from historian 325, and transmits via tunneller 324b over tunnel 338 to tunneller 334, represented symbolically by broken arrow 339. Historical data flow 339 is sent from tunneller 324b to historian 335 indirectly via history-writer 336. In an alternative embodiment (not shown), a separate component or process may be provided in connector 330 to re-initiate transmission of historical data from history-tunneller 327.

There is an important security advantage of this unique architecture that is not immediately apparent: it provides that no configuration information (other than configuration of the communication with historian 325 and authentication information allowing tunnellers 314 and 334 to connect) is stored inside DMZ 120 or in connector 320. It is only in either end of the intermediate network(s) (i.e., connector 310 in OT network 110 and connector 330 in IT network 130) that decisions over which data will be transferred are made. Therefore, only the "protected" networks (behind closed firewalls closed to incoming connection requests) hold this configuration information, and control thereof. A successful exploit of connector 320 or exploit within the DMZ 120 would not be able to expose more data than OT network 110 chooses to transmit. Moreover, and perhaps more importantly, each protected network (and its corresponding security and configuration settings) is isolated from the other protected network(s). That is, settings within connector 310 and OT network 110 are distinct from connector 330 and IT network 130 settings; they have no control over each other, and are also unknown to each other. Furthermore, the connectors 310, 330 themselves act to isolate the "end" historians from direct access from outside networks (e.g., from the intermediate network(s)), or even from internal networks if security requirements demand it. This degree of security isolation is a unique advantage of the present invention over the prior art, and represents a critical part of the security statement.

For example, the OPC UA protocol, which is a common standard industrial protocol that is promoted for its security, allows a 'reverse connection' from the server to client (the server could be a historian, and the client an 'edge' historian). But, to function, configuration information is necessary at the server and at the client, effectively splitting the configuration between the secure and insecure networks. The present invention avoids this insecure requirement.

The example embodiments described herein enable real-time data and historical data over the same tunnel connection and single port. By contrast, common commercial solutions, such as AVEVA™ Historian or OSIsoft PI™ database, require a separate port for database replication. Real-time data would necessarily be transmitted over a separate port (as well as by a distinct protocol), and out-of-band with the historical data transmission. The example embodiments described herein do not require the use of a second port or channel. Optionally, the real-time data and historical data may be carried over one or more sockets.

In some embodiments, the historical data is data compressed by using a data compression process.

In yet a further alternative embodiment (not shown), historians 315, 325, 335 can be built into one or more of connectors 310, 320, 330, respectively.

It is appreciated that for clarity, the example in FIG. 3 describes historical and/or real-time data "flow" from OT network 110 to DMZ 120 to IT network 130, or from left to right (for further clarity, see description of FIG. 7 below). However, it is within the scope of the invention that historical data flow may be bi-directional on all established tunnel connections, and that data flow can be easily reversed, or additional data sources can be added to meet system requirements and network topology. For example, an additional data source (not shown) could be added by way of an incoming connection to the DMZ 120 from another network. Another unique advantage of the present invention is the ability to initiate historical tunnelling from either end of a tunnel connection (i.e., from either connector). Accordingly, historical data can be "pushed" or "pulled" as demanded by the system requirements and network topology.

In more general terms, DMZ network 120 (and connector 320) represents an "intermediate" network. Advantageously, the present invention allows for as many intermediate networks (and data "hops" across them) as needed to meet system requirements and network topology. This enables a new capability for systems to store-and-forward historical data.

Figure 4:
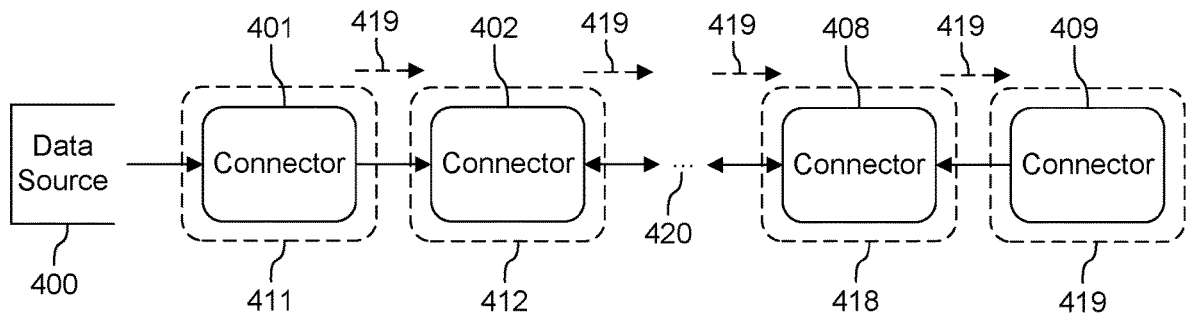
FIG. 4 is a block diagram illustrating an example system implementation, in accordance with one embodiment of the present invention.

An alternative example embodiment in accordance the present invention is illustrated symbolically in FIG. 4. As shown in FIG. 4, a data source 400 sends real-time and/or historical data to a connector 401 in a network 411 indirectly to connector 409 in network 419. In this example, historical data flow is from left to right, represented symbolically by broken arrows 419, over tunnel connections shown by solid arrows, while the arrow directions indicate the direction of initial connections. Preferably, each network is separated by a firewall that is closed to inbound connections (not shown). Connector 402 in network 412 sends data on to subsequent connectors/networks 420 until arriving at connector 408 in network 418. Intermediate networks 412, 418 with their corresponding connectors (402, 408) are functionally similar to network 120 and corresponding connector 320 in FIG. 3, but can receive an inbound connection or make an outbound connection as necessary to satisfy network security requirements, as illustrated by the double-arrowed solid lines between intermediate networks 412, 418 (and connector 402, 408, respectively) connecting any number of further intermediate networks 420 (with their corresponding connectors, not shown).

In some embodiments, any connector initiating a network connection stores connection security information. As well, no intermediate connector 402, 408, etc., contains connection security settings or configuration information from the "end" connectors 401, 409 inside networks 411, 419, respectively.

In some embodiments, one or more intermediate networks 412, 418, 420 include cloud-based brokers and network services.

In some embodiments, real-time data and historical data are transmitted over the same tunnel, thereby interleaving historical and real-time data over the same underlying connection. In some embodiments, the historical data is data compressed by using a data compression process.

Figure 5:
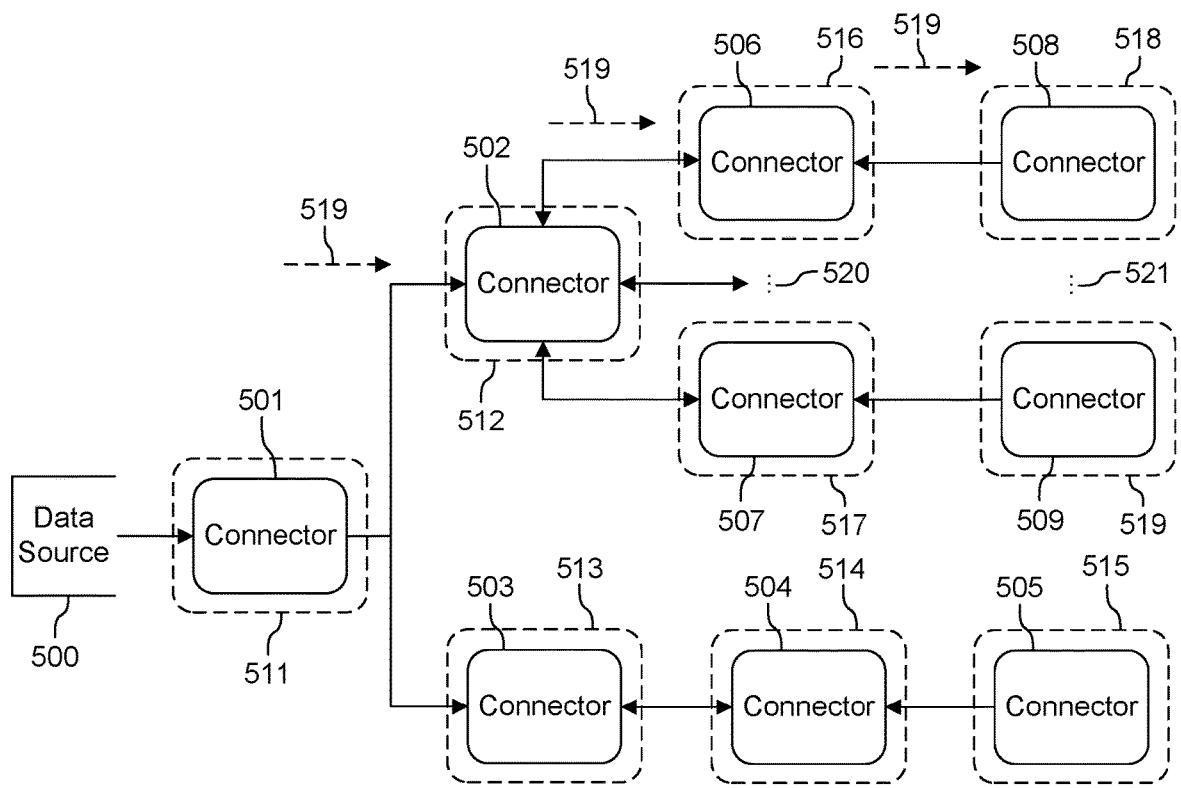
FIG. 5 a block diagram illustrating an example system implementation, in accordance with one embodiment of the invention.

Referring to FIG. 5, yet another embodiment is shown. One aspect of this embodiment is that the network architecture need not be 1:1. That is, a connector is capable of sending data to several connectors to distribute historical data simultaneously to several target systems. Similar to FIG. 4, a data source 500 sends real-time and/or historical data to a connector 501 in network 511 indirectly to connectors 505, 508, 509 in networks 515, 518, 519, respectively. In this example, historical data flow is from left to right, represented symbolically by broken arrows 519, over tunnel connections shown by solid arrows, while the arrow directions indicate the direction of initial connections. Preferably, each network is separated by a firewall that is closed to incoming connections (not shown). A connector 502 in network 512 sends data on to subsequent connectors 506, 507. The data, in turn, is sent on to connectors 508, 509 in networks 518, 519, respectively. In some embodiments, connector 502 also propagates data to any number of additional intermediate connectors/networks 520 to arrive at end connectors/networks 521. Intermediate networks 512, 513, 514, 516, 517, 520 with their corresponding connectors (502, 503, 504, 507, 506, 520) are functionally similar to network 120 in FIG. 3, but can make a connection in either direction, as illustrated by the double-arrow solid lines. This embodiment is advantageous to provide redundant historical data for a variety of useful purposes, such as to remote control systems, 3rd party suppliers, equipment manufacturers, analytics, AI analysis, etc. Effectively, historical data can be distributed to a web of systems.

In some embodiments, real-time data and historical data are transmitted over the same tunnel and the historical data is data compressed by using a data compression process.

Figure 6:
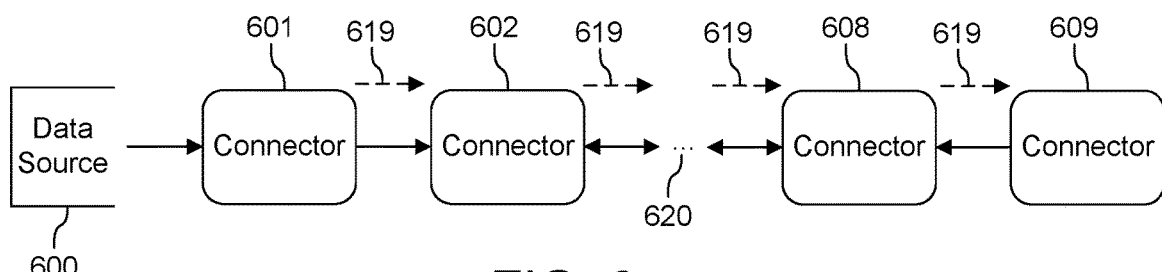
FIG. 6 is a block diagram illustrating an example system implementation, in accordance with one embodiment of the present invention.

Referring to FIG. 6, a further alternative embodiment is shown. Similar to FIG. 4, data source 600 sends real-time and/or historical data to connector 601 and indirectly to connector 609. Historical data flow is from left to right, represented symbolically by broken arrows 619, over tunnel connections shown by solid arrows, while the arrow directions indicate the direction of initial connections. In this example, the current invention is employed inside a single network, and the transmission characteristics between connectors 601, 602, 608, 609 and 620 are preserved, but without the added protection of firewalls between each connector. This is example is useful in a distributed system such as a single water treatment plant network or a single wind farm network, where there is a need to ensure that multiple storage servers are all up-to-date and contain complete copies of historical data. To meet system requirements, multiple different configurations (that are not 1:1) within a single network, similar to FIG. 5, are within the scope of the invention.

In some embodiments, real-time data and historical data are transmitted over the same tunnel, where the historical data is data compressed by using a data compression process.

Figure 7:
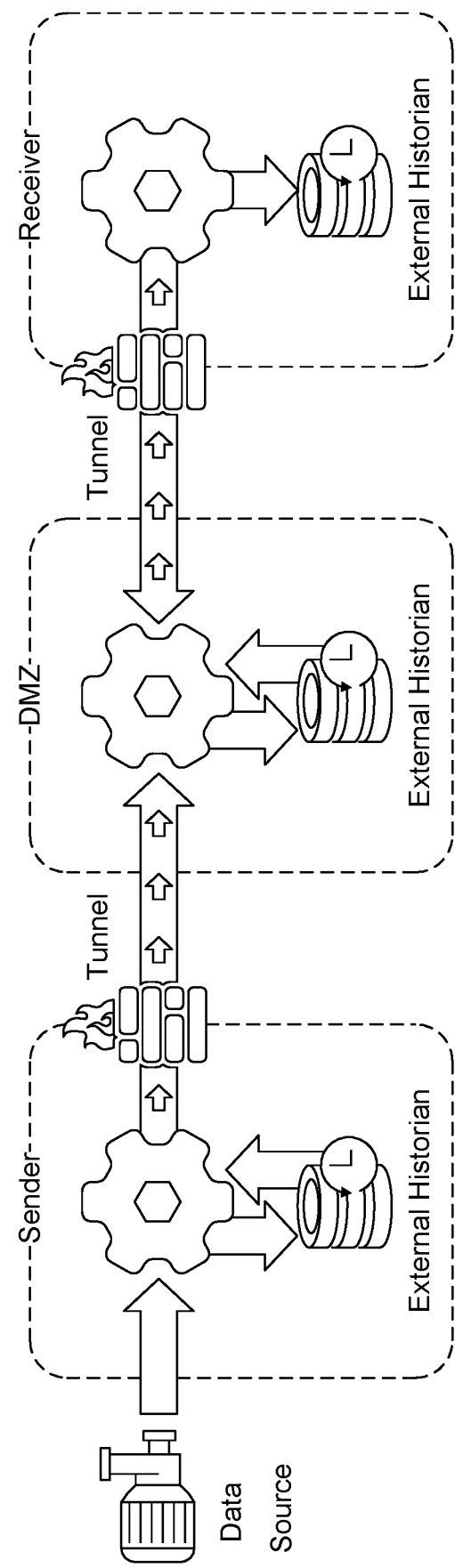
FIG. 7 is a block diagram illustrating an example system implementation, in accordance with one embodiment of the present invention.

Referring to FIG. 7, a further alternative embodiment is shown, similar in configuration to FIG. 3 and FIG. 4, to illustrate secure store-and-forward of historical data over a real-time tunnel. FIG. 7 shows a "sender" and "receiver" networks and computers, each protected by firewalls and also separated by a DMZ network and computer. Within each network, and in communication with (or running on) each computer, is an external historian. A data source sends data to the sender computer that stores historical data to an external historian (large white arrows). The sender establishes an outbound real-time tunnel connection (large black arrow) to the DMZ computer, over which historical data is sent (small white arrows), and stored on an external historian within the DMZ network. The receiver establishes an outbound real-time tunnel connection (large black arrow) to the DMZ computer, over which historical data is retrieved (small white arrows), and stored on an external historian within the receiver network. It should be noted that any different network types and labels are applicable to the present invention, e.g. Internet, IT network, OT network, sender/receiver networks, etc. Specific network labels are used to describe preferred embodiments and to provide context and clarity, but in no way limit the scope of the invention.

It should be understood that when referring to a network residing between, for instance, a server and a client, the network itself may comprise a series of network connections; that is, there is no implication of a direct connection. Similarly, any server, client or device 'on' the Internet is understood to mean that the server, client or device is connected to a network connection that is accessible to the Internet.

It is also understood that an authority on a data set, or an authoritative holder of a data set, refers to the originator of the data set, and all other recipients of the data set hold non-authoritative copies. In the present invention, a server, client or device can inherit authority from another server, client or device; for example, the cloud server may act as an authority on a data set for another client/end-user device; the client/end-user device sees the cloud server as the authority on the data set, but unknown to the client/end-user device, the cloud server may be propagating the data from a "true" authoritative client/end-user device connected to the cloud server. It is appreciated that the present invention allows for a myriad of combinations of servers, clients, and devices interconnected and inheriting authority over multiple data sets shared amongst them.

A data server may be any application designed to collect data from a data source or act as a data source itself, as long as it also supplies a TCP/IP communication method that can be accessed by a constructed data historian.

A data source may be any application or system capable of producing real-time data that can be converted into a format suitable for representation within the data server.

A data source may also be any application or system capable of producing non-real-time data that can be converted into a format suitable for representation within the server. The server can poll this data repeatedly or collect it by subscription to provide the data to a data historian even in the case that the original data is not real-time. For example, a database management system (DBMS) is generally not real-time, but the data can be polled repeatedly to create a periodically updating data set within the server, thus supplying a data historian with a pseudo-real-time view of the data within the DBMS.

The server and the data source may be combined into a single application, as may be the case with an OPC-UA server, or with an embedded device that offers access to its data via a TCP/IP connection.

A program developed using any compiled or interpreted computer language that can open and interact with a TCP/IP socket may be used in place of a data historian, which may or may not run within a web browser.

The client and server can implement wait states in any number of ways, including creating a new process thread to perform a synchronous wait or performing a multiple-event wait in a single thread. These are implementation details that will depend on choices made during the client and server implementations, but do not depart from the scope of the present invention.

Advantageously, the present invention is operable on any device that is capable of opening a TCP socket. For example, the client/server implementation may comprise multiple servers propagating data in real-time over a network or the Internet, optionally in a secure manner, without any major and therefore costly changes in existing infrastructure (e.g., security policies, firewalls, software, hardware, etc.). The present invention may be implemented, for example, by way of software code built-in to the data historian, a software add-on, a software plug-in, a scripting language, a separate software application, or a combination thereof.

Additional Clauses

The following are additional clauses relative to the present disclosure, which could be combined and/or otherwise integrated with any of the embodiments described above or listed in the claims below.

Clause 1. A method for providing access to historical data over a real-time tunnel, the method comprising:
    establishing, by a first connector (401, 601), a first tunnel connection between the first connector (401, 601) and a second connector (402, 602);
    establishing, by a third connector (409, 609), a second tunnel connection between the third connector (409, 609) and a fourth connector (408, 608);
    obtaining by the first connector (401, 601), data; and
    propagating the data from the first connector (401, 601) to the third connector (409, 609) through the first tunnel connection and the second tunnel connection.

Clause 2. The method of Clause 1, wherein the first connector (401, 601), the second connector (402, 602), the third connector (409, 609) and the fourth connector (408, 608) are in a same network.

Clause 3. The method of Clause 1, further comprising:
    configuring a first network (411) to include the first connector (401);
    configuring a second network (412) to include the second connector (402);
    configuring a third network (419) to include the third connector (409);
    configuring a fourth network (418) to include the fourth connector (408); and
    separating each of the first network (411), the second network (412), the third network (419), and the fourth network (418) by a respective firewall.

Clause 4. The method according to any of Clauses 1-3, wherein the data is (i) real-time data, (ii) historical data, or (iii) a combination of (i) and (ii).

Clause 5. The method according to any of Clauses 3-4, further comprising:

receiving, by the second network (412), an inbound connection.

Clause 6. The method according to any of Clauses 3-5, further comprising:

making, by the first network (411), an outbound connection.

Clause 7. The method according to any of Clauses 2-6, further comprising:

initiating, by any one of the (i) first connector (401, 601), (ii) the second connector (402, 602), (iii) the third connector (409, 609) or (iv) the fourth connector (408, 608), a connection; and storing, by the connector initiating the connection, security information.

Clause 8 A method for providing access to historical data over a real-time tunnel in an architecture including an OT network (110), a DMZ (120) and an IT network (130), comprising:

interleaving real-time data and historical data over a secure tunnel connection (318), a first firewall (111) and a second firewall (131) by (a) performing pull replication of the historical data, (b) daisy chaining the historical data, or (c) a combination of (a) and (b).

Clause 9. The method of Clause 8, further comprising:

closing the first firewall (111) and the second firewall (131) to all inbound connection requests, thereby isolating the IT network (110) and the OT network (130) from DMZ (120).

Clause 10. The method according to any of Clauses 8 and 9, further comprising:

obtaining from a data source (100), by a first connector (310), real-time data, wherein the first connector (310) includes a first tunneller (314), a first history-writer (316) and a first history-tunneller (317).

Clause 11. The method according to any of Clauses 8-10, further comprising:

writing the real time data to the first history-writer (316).

Clause 12. The method according to any of Clauses 8-11, further comprising:

writing the real time data to the first tunneller (314).

Clause 13. The method according to any of Clauses 8-12, further comprising:

writing the real-time data, by the first history writer (316), to a first historian (315).

Clause 14. The method according to any of Clauses 8-13, wherein the first historian (315) is external from the first connector (310).

Clause 15. The method according to any of Clauses 8-14, wherein the first historian (315) is an application external from the first connector (310).

Clause 16. The method according to any of Clauses 8-15, further comprising:

obtaining from the data source (100), by the first historian (315).

Clause 17. The method according to any of Clauses 8-16, further comprising:

obtaining, from the data source (100) by the first historian (315), the real-time data via the first history-writer (316).

Clause 18. The method according to any of Clauses 8-17, further comprising:

retrieving, from the first historian (315), historical data; and propagating, by the first history-tunneller (317), the historical data retrieved from the first historian (315) to the first tunneller (314).

Clause 19. The method according to any of Clauses 8-18, further comprising:

establishing a first tunnel connection (318) from the first tunneller (314) to a first DMZ tunneller (324a) by an outbound connection request from the OT network (110) including the first tunneller (314) to the DMZ (120) including the first DMZ tunneller (324a).

Clause 20. The method according to any of Clauses 8-19, further comprising:

re-establishing, by the first tunneller (314), a lost connection to the first DMZ tunneller (324a);

re-initiating, by the first history-tunneller (317), transmission of missed historical data;

retrieving, by the first history-tunneller (317) the historical data from the first historian (315);

transmitting, by the first history-tunneller (317), missed historical data via the first tunneller (314) over the first tunnel connection (318) to the first DMZ tunneller (324a); and propagating the historical data from the first DMZ tunneller (324a) to a second historian (325) via a second history-writer (326), where the first DMZ tunneller (324a), the second historian (325) and the second history-writer (326) are in the DMZ (120).

Clause 21. The method according to any of Clauses 8-20, an initial connection of the tunnel connection (318) and a first initiation of transmission of a historical data flow (319) via the tunnel connection (318) is equivalent to a network reconnection.

Clause 22. The method according to any of Clauses 8-21, further comprising:

sending, by the second historian (325), a confirmation response to the second history-writer (326) confirming receipt of missed historical data.

Clause 23. The method according to any of Clauses 8-22, further comprising:

delivering, via the first DMZ tunneller (324a) and the first tunneller (314), the response confirmation response to first history-tunneller (317).

Clause 24. The method according to any of Clauses 8-23, further comprising:

establishing a second tunnel connection (338) from a third tunneller (334) in the IT network (130) to a second DMZ tunneller (324b) in the DMZ (120) by an outbound connection request from the IT network (130) to the DMZ (120).

Clause 25. The method according to any of Clauses 8-24, further comprising:

re-establishing, by the third tunneller (334), a lost connection to the second DMZ tunneller (324b);

sending, by the third tunneller (334) a request to the second history-tunneller (327) to re-initiate transmission of historical data;

retrieving, by the second history-tunneller (327) the historical data from the second historian (325); and transmitting, via the second DMZ tunneller (324b) over the second tunnel connection (338) to the third tunneller (334), the historical data.

Clause 26. The method according to any of Clauses 8-25, wherein the historical data flow (339) is sent from the second DMZ tunneller (324b) to the third historian (335) via the third history-writer (336).

Clause 27. The method according to any of Clauses 8-26, wherein the first historian (315), the second historian (325)

and the third historian (335) are built into one or more of the first connector (310), second connector (320), and third connector (330), respectively.

Clause 28. The method according to any of Clauses 8-27, wherein the first DMZ tunneller (324a) and the second DMZ tunneller (324b) are the same tunneller.

Clause 29. A method for providing access to historical data over a real-time tunnel, the method comprising:
  receiving, by a first connector (501), (i) real-time, (ii) historical data, or (iii) a combination of (i) and (ii) from a data source (500); and
  transmitting, by the first connector (501) to at least one intermediary connector (502, 503), (i) the real-time, (ii) the historical data, or (iii) a combination of (i) and (ii); and
  transmitting, by the intermediate connector (502, 503) to at least one end connector (505, 508, 509).

Clause 30. The method according to Clause 28, wherein the first connector (501) is in a first network (511), the at least one intermediate connector (502, 503) is in a corresponding
  intermediate network (512, 513), and the at least one end connector (505, 508, 509) is in a corresponding end network (515, 518, 519).

Clause 31. The method according to any of Clauses 30, wherein each of the first network (511), the corresponding intermediate network (512, 513), and the corresponding end network (515, 518, 519) is separated by a firewall that is closed to incoming connections.

Clause 32. A system for providing access to historical data over a real-time tunnel, the method comprising:
  a first connector (401, 601) configured to establish a first tunnel connection with a second connector (402, 602) and to receive data from a data source (100);
  a third connector (409, 609) configured to establish a second tunnel connection with a fourth connector (408, 608); and
  the first connector (401, 601) configured to propagate the data to the third connector (409, 609) through the first tunnel connection and the second tunnel connection.

Clause 33. The system of Clause 32, wherein the first connector (401, 601), the second connector (402, 602), the third connector (409, 609) and the fourth connector (408, 608) are in a same network.

Clause 34. The system of Clause 32, wherein:
  the first connector (401) is configured to be included in a first network (411);
  the second connector (402) is configured to be included in a second network (412);
  the third connector (409) is configured to be included in a third network (419);
  the fourth connector (408) is configured to be included in a fourth network (418); and
  each of the first network (411), the second network (412), the third network (419), and the fourth network (418) is configured to be separated by a respective firewall.

Clause 35. The system according to any of Clauses 32-34, wherein the data is (i) real-time data, (ii) historical data, or (iii) a combination of (i) and (ii).

Clause 36. The system according to any of Clauses 32-35, wherein:
  at least one of the (i) first connector (401, 601), (ii) the second connector (402, 602), (iii) the third connector (409, 609) and (iv) the fourth connector (408, 608) further configured to:
    initiate a connection; and
    store, by the connector initiating the connection, security information.

Clause 37. A system for providing access to historical data over a real-time tunnel, comprising:
  an OT network (110) configured to interleave real-time data and historical data over a secure tunnel connection (318), a first firewall (111) and a second firewall (131) in conjunction with a DMZ (120) and an IT network (130) by (a) performing pull replication of the historical data, (b) daisy chaining the historical data, or (c) a combination of (a) and (b).

Clause 38. A connector (310) for providing access to historical data over a real-time tunnel, comprising:
  a first history-writer (316) configured to obtain real-time data from a data source (100);
  the first history-writer (316) configured to store the real-time data and supply the real-time data to a first historian (315);
  a first history-tunneller (317) configured to retrieve historical data from the first historian (315); and
  a first tunneller (314) configured to store and forward the real-time data and the historical data.

Clause 39. The connector (310) of Clause 38, the first history writer (316) further configured to:
  write the real-time data to a first historian (315).

Clause 40. The connector (310) of Clause 39, wherein the first historian (315) is external from the first connector (310).

Clause 41. The connector (310) according to Clause 39, wherein the first historian (315) is an application external from the first connector (310).

Clause 42. The connector (310) according to Clause 38, the first tunneller (314) further configured to:
  establishing a first tunnel connection (318) with a first DMZ tunneller (324a) by transmitting an outbound connection request.

Clause 43. The connector (310) according to Clause 42:
  the first tunneller (314) further configured to re-establish a lost connection to the first DMZ tunneller (324a);
  the first history-tunneller (317) further configured to re-initiate transmission of missed historical data;
  the first history-tunneller (317) further configured to retrieve the historical data from the first historian (315); and
  the first history-tunneller (317) further configured to transmit the missed historical data via the first tunneller (314) over the first tunnel connection (318) to the first DMZ tunneller (324a).

Clause 44. The connector (310) according to any of Clauses 38-43:
  the first tunneller (314) further configured to receive a confirmation response and forward the confirmation response to the first history-tunneller (317), and
  the confirmation response confirming receipt of missed historical data by a second historian (325).

Clause 45. The connector (310) according to any of Clauses 38-44, an initial connection of the tunnel connection (318) and a first initiation of transmission of a historical data flow (319) via the tunnel connection (318) is equivalent to a network reconnection.

Clause 46. The connector (310) according to Clause 38, further comprising:
  the first historian (315).

Clause 47. A connector (320) for providing access to historical data over a real-time tunnel, comprising:
  a first DMZ tunneller (324a) configured to receive (i) real time data, (ii) historical data, or (iii) a combination of (i) and (ii) via a tunnel connection (318);

a second history-writer (326) configured to propagate historical data to a second historian (325);

second history-tunneller (327) configured to retrieve the historical data from the second historian (325); and a second DMZ tunneller (324*b*) configured to transmit over the second tunnel connection (338) (*i*) the real-time data, (ii) the historical data, or (iii) a combination of (i) and (ii).

Clause 48. The connector (320) of Clause 47, the second history-writer (326) further configured to receive from a second historian (325), a confirmation response confirming receipt of missed historical data.

Clause 49. The connector (320) according to Clause 48, the first DMZ tunneller (324*a*) configured to deliver via the first tunneller (314), the confirmation response.

Clause 50. The connector (320) according to any of Clauses 47-49, wherein an initial connection of the tunnel connection (318) and a first initiation of transmission of a historical data flow (319) via the tunnel connection (318) is equivalent to a network reconnection.

Clause 51. The connector (320) according to any of Clauses 47-50, the second DMZ tunneller (324*b*) further configured to receive a connection request and establish a second tunnel connection (338) with a third tunneller (334).

Clause 52. The connector (320) according to any of Clauses 47-51:

the second DMZ tunneller (324*b*) further configured to re-establishing a lost connection with the third tunneller (334);

the second history-tunneller (327) further configured to receive a request to re-initiate transmission of historical data and retrieve the historical data from the second historian (325); and the second DMZ tunneller (324*b*) further configured to transmit over the second tunnel connection (338) the historical data.

Clause 53. The connector (320) according to any of Clauses 47-52, further comprising:

the second historian (325).

Clause 54. The connector (320) according to Clause 47, further comprising:

wherein the first DMZ tunneller (324*a*) and the second DMZ tunneller (324*b*) are the same tunneller.

Clause 55. A connector (330) for providing access to historical data over a real-time tunnel, comprising:

a third tunneller (334) configured to establish a second tunnel connection (338) with a second DMZ tunneller (324*b*) and receive (i) real-time data, (ii) historical data, or (iii) a combination of (i) and (ii); and a third history-writer (336) configured to send historical data to a third historian (335).

Clause 56. The connector (330) of Clause 55:

the third-tunneller (334) further configured to re-establish a lost connection with the second DMZ tunneller (324*b*) and receive historical data over the second tunnel connection (338).

Clause 57. The connector (330) according to any of Clauses 55-56, further comprising the third historian (335).

Clause 58. A method for providing access to historical data over a real-time tunnel, the method comprising:

establishing, by a first connector (310), a first tunnel connection (318) from the first connector (310) to a second connector (320);

establishing, by a third connector (330), a second tunnel connection (338) from the third connector (330) to the second connector (320);

obtaining by the first connector (310), data; and propagating the data from the first connector (310) to the third connector (330) through the first tunnel connection and the second tunnel connection.

Clause 59. The method according to Clause 58, further comprising:

retrieving, by the first connector (310), historical data from a first historian (315); and transmitting, by the first connector (310), the historical data over the first tunnel connection (318) to the second connector (320).

Clause 60. The method according to any of Clauses 58-59, further comprising:

receiving, by the second connector (320), (i) real time data, (ii) historical data, or (iii) a combination of (i) and (ii) via a tunnel connection (318);

propagating, by the second connector (320), historical data to a second historian (325);

retrieving, by the second connector (320) the historical data from the second historian (325); and transmitting, by the second connector (320), via the second tunnel connection (338) (*i*) the real-time data, (ii) the historical data, or (iii) a combination of (i) and (ii).

Clause 61. The method according to any of Clauses 58-60, further comprising:

establishing, by the third connector (330) a second tunnel connection (338) with the second connector (320);

receiving, by the third connector (330) (*i*) real-time data, (ii) historical data, or (iii) a combination of (i) and (ii); and sending, by the third connector (330) historical data to a third historian (335).

Clause 62. A non-transitory computer-readable medium having stored thereon one or more sequences of instructions for causing one or more processors to perform any of the methods of Clauses 1-31 and 58-61.

What is claimed is:

1. A method for providing access to historical data over a real-time tunnel in an architecture including an operational technology (OT) network, a de-militarized zone (DMZ) and an information technology (IT) network, comprising:

obtaining from a data source, by a first connector, real-time data, wherein the first connector includes a first tunneller, a first history-writer and a first history-tunneller;

interleaving real-time data and historical data over a first tunnel connection, a first firewall and a second firewall by (a) performing pull replication of historical data, (b) daisy chaining the historical data, or (c) a combination of (a) and (b); and writing the real time data to the first history-writer.

2. The method of claim 1, further comprising:

closing the first firewall and the second firewall to all inbound connection requests, thereby isolating the IT network and the OT network from DMZ.

3. The method according to claim 2, further comprising:

writing the real time data to the first tunneller.

4. The method according to claim 2, further comprising:

writing the real-time data, by the first history writer, to a first historian.

5. The method according to claim 4, wherein the first historian is external from the first connector.

6. The method according to claim 4, wherein the first historian is an application external from the first connector.

7. The method according to claim 4, further comprising:

obtaining from the data source, by the first historian.

8. The method according to claim 4, further comprising:
obtaining, from the data source by the first historian, the real-time data via the first history-writer.

9. The method according to claim 4, further comprising:
retrieving, from the first historian, historical data; and
propagating, by the first history-tunneller, the historical data retrieved from the first historian to the first tunneller.

10. The method according to claim 2, further comprising:
establishing the first tunnel connection from the first tunneller to a first DMZ tunneller by an outbound connection request from the OT network including the first tunneller to the DMZ including the first DMZ tunneller.

11. The method according to claim 10, further comprising:
re-establishing, by the first tunneller, a lost connection to the first DMZ tunneller;
re-initiating, by the first history-tunneller, transmission of missed historical data;
retrieving, by the first history-tunneller the historical data from the first historian;
transmitting, by the first history-tunneller, missed historical data via the first tunneller over the first tunnel connection to the first DMZ tunneller; and
propagating the historical data from the first DMZ tunneller to a second historian via a second history-writer, where the first DMZ tunneller, the second historian and the second history-writer are in the DMZ.

12. The method according to claim 11, wherein an initial connection of the first tunnel connection and a first initiation of transmission of a historical data flow via the first tunnel connection is equivalent to a network reconnection.

13. The method according to claim 11, further comprising:
sending, by the second historian, a confirmation response to the second history-writer confirming receipt of missed historical data.

14. The method according to claim 13, further comprising:
delivering, via the first DMZ tunneller and the first tunneller, the confirmation response to first hi story-tunneller.

15. The method according to claim 11, further comprising:
establishing a second tunnel connection from a third tunneller in the IT network to a second DMZ tunneller in the DMZ by an outbound connection request from the IT network to the DMZ.

16. The method according to claim 15, further comprising:
re-establishing, by the third tunneller, a lost connection to the second DMZ tunneller;
sending, by the third tunneller a request to the second history-tunneller to re-initiate transmission of historical data;
retrieving, by a second history-tunneller the historical data from the second historian; and
transmitting, via the second DMZ tunneller over the second tunnel connection to the third tunneller, the historical data.

17. The method according to claim 15, wherein the historical data flow is sent from the second DMZ tunneller to a third historian via a third history-writer.

18. The method according to claim 17, wherein the first historian, the second historian and the third historian are built into one or more of the first connector, second connector, and third connector, respectively.

19. A system for providing access to historical data over a real-time tunnel, comprising:
an operational technology (OT) network including one or more hardware processors configured to:
obtain from a data source, by a first connector, real-time data, wherein the first connector includes a first tunneller, a first history-writer and a first history-tunneller;
interleave the real-time data and historical data over a first tunnel connection, a first firewall and a second firewall in conjunction with a de-militarized zone (DMZ) and an information technology (IT) network by (a) performing pull replication of historical data, (b) daisy chaining the historical data, or (c) a combination of (a) and (b); and
write the real time data to the first history-writer.

20. The system of claim 19, wherein at least one of the one or more hardware processors is configured to:
close the first firewall and the second firewall to all inbound connection requests, thereby isolating the IT network and the OT network from DMZ.

21. The system of claim 19, wherein at least one of the one or more hardware processors is configured to:
write the real time data to the first tunneller.

22. The system of claim 19, wherein at least one of the one or more hardware processors is configured to:
write the real-time data, by the first history writer, to a first historian.

23. The system of claim 22, wherein the first historian is external from the first connector.

24. The system of claim 22, wherein the first historian is an application external from the first connector.

25. The system of claim 22, wherein at least one of the one or more hardware processors is configured to:
obtain from the data source, by the first historian.

26. The system of claim 22, wherein at least one of the one or more hardware processors is configured to:
obtain, from the data source by the first historian, the real-time data via the first history-writer.

27. The system of claim 22, wherein at least one of the one or more hardware processors is configured to:
retrieve, from the first historian, historical data; and
propagate, by the first history-tunneller, the historical data retrieved from the first historian to the first tunneller.

28. The system of claim 19, wherein at least one of the one or more hardware processors is configured to:
establish the first tunnel connection from the first tunneller to a first DMZ tunneller by an outbound connection request from the OT network including the first tunneller to the DMZ including the first DMZ tunneller.

29. The system of claim 28, wherein at least one of the one or more hardware processors is configured to:
re-establish, by the first tunneller, a lost connection to the first DMZ tunneller;
re-initiate, by the first history-tunneller, transmission of missed historical data;
retrieve, by the first history-tunneller the historical data from the first historian;
transmit, by the first history-tunneller, missed historical data via the first tunneller over the first tunnel connection to the first DMZ tunneller; and
propagate the historical data from the first DMZ tunneller to a second historian via a second history-writer, where the first DMZ tunneller, the second historian and the second history-writer are in the DMZ.

30. The system of claim 29, wherein an initial connection of the first tunnel connection and a first initiation of transmission of a historical data flow via the first tunnel connection is equivalent to a network reconnection.

31. The system of claim 29, wherein at least one of the one or more hardware processors is configured to:
send, by the second historian, a confirmation response to the second history-writer confirming receipt of missed historical data.

32. The system of claim 31, wherein at least one of the one or more hardware processors is configured to:
delivering, via the first DMZ tunneller and the first tunneller, the confirmation response to first history-tunneller.

33. The system of claim 29, wherein at least one of the one or more hardware processors is configured to:
establishing a second tunnel connection from a third tunneller in the IT network to a second DMZ tunneller in the DMZ by an outbound connection request from the IT network to the DMZ.

34. The system of claim 33, wherein at least one of the one or more hardware processors is configured to:
re-establishing, by the third tunneller, a lost connection to the second DMZ tunneller;
sending, by the third tunneller a request to the second history-tunneller to re-initiate transmission of historical data;
retrieving, by a second history-tunneller the historical data from the second historian; and
transmitting, via the second DMZ tunneller over the second tunnel connection to the third tunneller, the historical data.

35. The system of claim 33, wherein the historical data flow is sent from the second DMZ tunneller to a third historian via a third history-writer.

36. The system of claim 35, wherein the first historian, the second historian and the third historian are built into one or more of the first connector, second connector, and third connector, respectively.

37. A non-transitory computer-readable medium having stored thereon one or more sequences of instructions, which when executed by one or more hardware processors, cause the one or more hardware processors to provide access to historical data over a real-time tunnel in an architecture including an operational technology (OT) network, a de-militarized zone (DMZ) and an information technology (IT) network by:
obtaining from a data source, by a first connector, real-time data, wherein the first connector includes a first tunneller, a first history-writer and a first history-tunneller;
interleaving the real-time data and historical data over a first tunnel connection, a first firewall and a second firewall by (a) performing pull replication of the historical data, (b) daisy chaining the historical data, or (c) a combination of (a) and (b); and
writing the real time data to the first history-writer.

* * * * *